United States Patent
Gagne et al.

(10) Patent No.: US 11,274,954 B2
(45) Date of Patent: *Mar. 15, 2022

(54) FLUID FLOW MONITORING ASSEMBLY INCLUDING A FLOW SENSOR HOUSING REMOVABLY SECURED TO A FLEXIBLE CONDUIT THAT ENCAPSULATES THE REMOVABLE SENSOR

(71) Applicant: Repligen Corporation, Waltham, MA (US)

(72) Inventors: Michael C. Gagne, Carson City, NV (US); Dean C. Richards, Simi Valley, CA (US); Steven V. Cates, Lakewood, CA (US)

(73) Assignee: Repligen Corporation, Waltham, MA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/718,084

(22) Filed: Dec. 17, 2019

(65) Prior Publication Data

US 2020/0300682 A1 Sep. 24, 2020

Related U.S. Application Data

(63) Continuation of application No. 16/393,551, filed on Apr. 24, 2019, now Pat. No. 10,557,739, which is a
(Continued)

(51) Int. Cl.
*G01F 1/66* (2006.01)
*G01F 15/18* (2006.01)
(Continued)

(52) U.S. Cl.
CPC .............. *G01F 15/18* (2013.01); *G01F 1/662* (2013.01); *G01F 1/667* (2013.01); *G01F 15/005* (2013.01); *G01F 15/14* (2013.01)

(58) Field of Classification Search
None
See application file for complete search history.

(56) References Cited

U.S. PATENT DOCUMENTS

| 2,931,387 A | 4/1960 | Fleming |
| 4,254,797 A | 3/1981 | Mayeaux |
| (Continued) | | |

FOREIGN PATENT DOCUMENTS

| DE | 102011084171 A1 | 5/2012 |
| EP | 2615428 A1 | 7/2013 |
| (Continued) | | |

OTHER PUBLICATIONS

PCT International Search Report for PCT/US2016/032895, Applicant: Alphinity, LLC, Form PCT/ISA/237, dated Aug. 16, 2016 (3pages).

(Continued)

*Primary Examiner* — Harshad R Patel
(74) *Attorney, Agent, or Firm* — Kacvinsky Daisak Bluni PLLC

(57) ABSTRACT

A method of using a fluid monitoring assembly for measuring the flow rate of a fluid through a flexible conduit comprising a wall that defines a lumen through which the fluid passes. The assembly includes a housing having first and second portions each defining respective recessed interior portions that define a cavity that is configured to encapsulate and retain the flow sensor and the flexible tubing contained therein. The flow sensor may be removably secured around the outside of the flexible conduit and include one or more transducer/receiver pairs.

8 Claims, 9 Drawing Sheets

Related U.S. Application Data continuation of application No. 15/574,262, filed as application No. PCT/US2016/032895 on May 17, 2016, now Pat. No. 10,309,818.

(60) Provisional application No. 62/163,851, filed on May 19, 2015.

(51) Int. Cl.
  *G01F 1/667* (2022.01)
  *G01F 15/14* (2006.01)
  *G01F 15/00* (2006.01)

(56) References Cited

U.S. PATENT DOCUMENTS

| | | | |
|---|---|---|---|
| 4,895,341 A | 1/1990 | Brown | |
| 5,197,708 A | 3/1993 | Campau | |
| 5,350,290 A | 9/1994 | Honings | |
| 5,440,936 A | 8/1995 | Spani et al. | |
| 5,549,134 A | 8/1996 | Browne et al. | |
| 6,036,166 A | 3/2000 | Olson | |
| 6,068,751 A | 5/2000 | Neukermans | |
| 6,418,796 B1 | 7/2002 | Baumoel | |
| 6,543,483 B2 | 4/2003 | Johnson | |
| 6,554,589 B2 | 4/2003 | Grapes | |
| 6,631,736 B2 | 10/2003 | Seitz et al. | |
| 6,644,353 B1 | 11/2003 | Eidsmore | |
| 6,976,664 B2 | 12/2005 | Welch et al. | |
| 7,104,275 B2 | 9/2006 | Dille | |
| 7,367,363 B2 | 5/2008 | Friedline et al. | |
| 7,383,853 B2 | 6/2008 | Welch et al. | |
| 8,235,067 B2 | 8/2012 | Gagne et al. | |
| 8,656,951 B2 | 2/2014 | Gagne et al. | |
| 9,447,888 B2 | 9/2016 | Gagne et al. | |
| 10,215,597 B2 * | 2/2019 | Gagne | G01D 11/30 |
| 10,309,818 B2 * | 6/2019 | Gagne | G01F 1/662 |
| 10,557,739 B2 * | 2/2020 | Gagne | G01F 15/14 |
| 2003/0010946 A1 | 1/2003 | Furukawa | |
| 2004/0163711 A1 | 8/2004 | Varone | |
| 2004/0254469 A1 * | 12/2004 | Shkarlet | A61B 5/6876 600/459 |
| 2006/0020239 A1 | 1/2006 | Geiger et al. | |
| 2007/0278155 A1 | 12/2007 | Lo et al. | |
| 2007/0295867 A1 | 12/2007 | Hennon | |
| 2008/0035227 A1 | 2/2008 | Woods et al. | |
| 2008/0237509 A1 | 10/2008 | Yamamoto | |
| 2009/0120503 A1 | 5/2009 | Donahue | |
| 2010/0288385 A1 | 11/2010 | Gagne et al. | |
| 2010/0307263 A1 * | 12/2010 | Gysling | G01F 1/662 73/861.25 |
| 2012/0018654 A1 | 1/2012 | Wennberg et al. | |
| 2012/0279594 A1 | 11/2012 | Gagne et al. | |
| 2012/0318069 A1 | 12/2012 | Murakami | |
| 2013/0080081 A1 | 3/2013 | Dugger et al. | |
| 2013/0180341 A1 | 7/2013 | Murakami | |
| 2013/0305839 A1 | 11/2013 | Muench et al. | |
| 2014/0138563 A1 | 5/2014 | Gagne et al. | |
| 2016/0369902 A1 | 12/2016 | Gagne et al. | |

FOREIGN PATENT DOCUMENTS

| | | |
|---|---|---|
| GB | 1055426 | 1/1967 |
| JP | 2004293769 A | 10/2004 |
| WO | 2015/066229 A2 | 5/2015 |

OTHER PUBLICATIONS

PCT Written for PCT/US2016/032895, Applicant: Alphinity, LLC, Form PCT/IB/326 and 373, dated Aug. 16, 2016 (6pages).

PCT International Preliminary Report on Patentability (Chapter I of the Patent Cooperation Treaty) for PCT/US2016/032895, Applicant: Alphinity, LLC, Form PCT/IB/326 and 373, dated Nov. 30, 2017 (8pages).

Written Opinion dated Sep. 18, 2018 in Singapore Patent Application No. 11201709219P; (7pages).

The extended European search report dated Jan. 11, 2019 in European Patent Application No. 16797151.4, Applicant: Alphinity, LLC, (9pages).

Communication pursuant to Rules 70(2) and 70a(2) EPC dated Jan. 29, 2019 in European Patent Application No. 16797151.4, Applicant: Alphinity, LLC, (1page).

BioWorks LLC Product Brochure (date: unknown), BSC: Bio Sample Cup, Safe, Sanitary Material Storage, Easton, PA 18042, www.BioWorksLLC.com (6 pages).

Parker Mitos Product Brochure, Mitos Free Flow Valve, Apr. 29, 2009, http://www.mitostech.com/freelow.html (2 pages).

PCT International Search Report for PCT/US10/34371, Applicant: AlphaBio, Inc., Form PCT/ISA/210 and 220, dated Jul. 1, 2010 (4 pages).

PCT Written Opinion of the International Search Authority for PCT/US10/34371, Applicant: AlphaBio, Inc., Form PCT/ISA/237, dated Jul. 1, 2010 (7 pages).

PCT International Preliminary Report on Patentability (Chapter I of the Patent Cooperation Treaty) for PCT/US2010/034371, Applicant: AlphaBio, Inc., Form PCT/IB/326 and 373, dated Nov. 15, 2011 (9 pages).

BioWorks LLC Catalog, Model: BSV-H250-Bo, www.BioWorksLLC.com, cited in U.S. Appl. No. 14/165,206 dated Aug. 25, 2014 (6pages).

The extended European search report dated Nov. 29, 2016 in European Application No. 10775392.3-1751, Applicant: Alphinity, LLC, (10pages).

Notice of Preliminary Rejection dated Dec. 14, 2016 in Korean Patent Application No. 10-2011-7027072, (11pages).

BioWorks! LLC BTV Manifold Brochure, Date May 12, 2006, http://bioworksllc.com/pdf.

BioWorks LLC http://bioworksllc.com/pdf/BTV_Manifold_Brochure_rev1.pdf, pub. date May 19, 2016 (Wayback Machine).

Response to extended European search report dated Aug. 8, 2019 in European Patent Application No. 16797151.4, Applicant: Alphinity, LLC, (12 pages).

Response to Written Opinion dated Feb. 8, 2019 in Singapore Patent Application No. 11201709219P, Applicant: Alphinity, LLC, (14pages).

Examination Report issued Jul. 15, 2019 in Singapore Patent Application No. 11201709219P, Applicant: Alphinity, LLC, (6pages).

\* cited by examiner

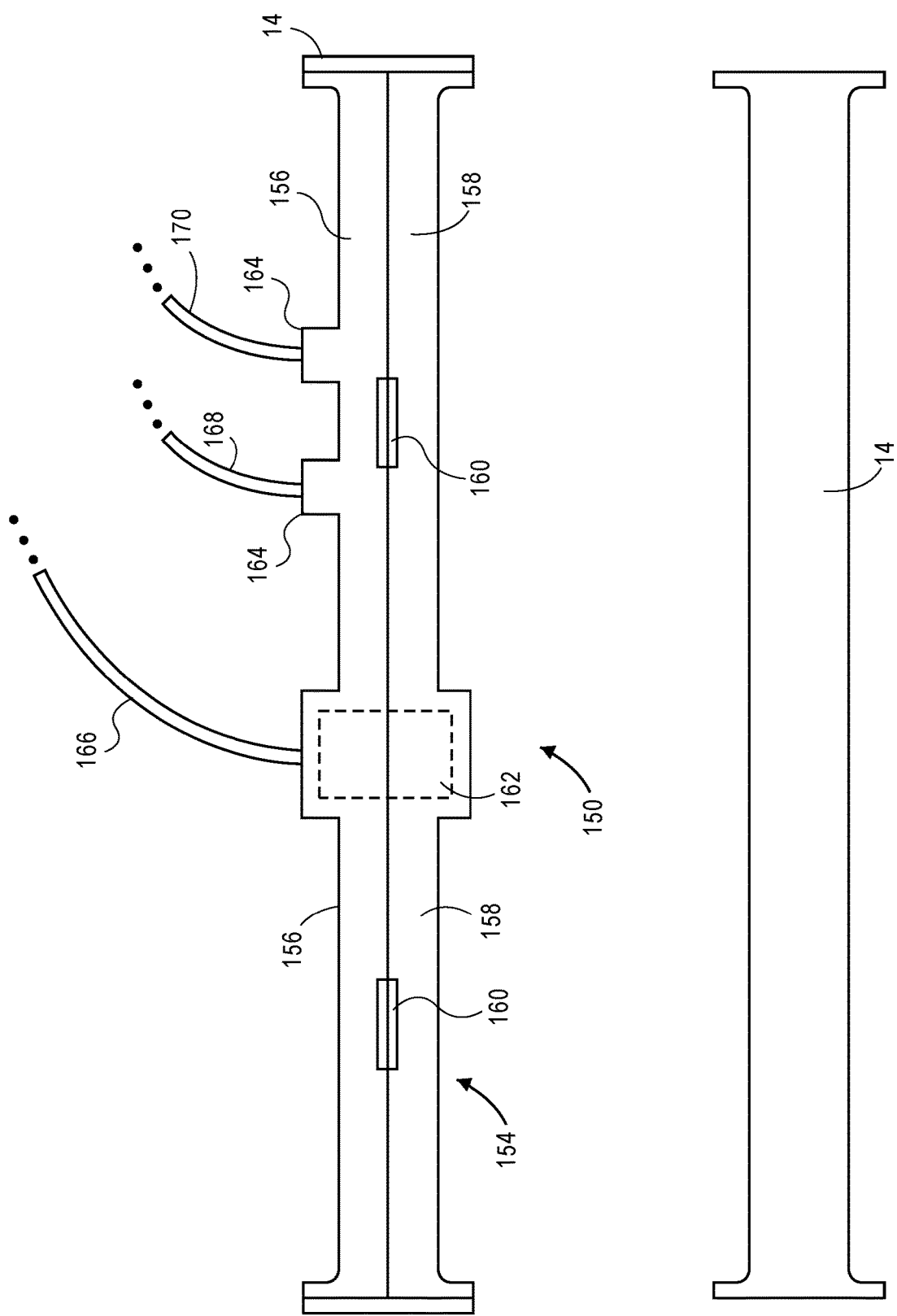

FLUID FLOW MONITORING ASSEMBLY INCLUDING A FLOW SENSOR HOUSING REMOVABLY SECURED TO A FLEXIBLE CONDUIT THAT ENCAPSULATES THE REMOVABLE SENSOR

RELATED APPLICATION

This Application is a continuation of U.S. application Ser. No. 16/393,551, filed on Apr. 24, 2019, now allowed, which itself is a continuation of U.S. application Ser. No. 15/574,262 filed on Nov. 15, 2017, issued as U.S. Pat. No. 10,309,818, which is a U.S. National Stage filing under 35 U.S.C. § 371 of International Application No. PCT/US2016/032895, filed May 17, 2016, which claims priority to U.S. Provisional Patent Application No. 62/163,851 filed on May 19, 2015, which are hereby incorporated by reference in its entirety. Priority is claimed pursuant to 35 U.S.C. §§ 119, 371 and any other applicable statute.

FIELD OF THE INVENTION

The field of the invention generally relates to fluid monitoring devices and, in particular, segments of conduit or tubing that incorporate flow sensor functionality. More specifically, the invention pertains to connectors, valves, or interfaces used by pharmaceutical and biological applications or other hygienic process industries that include flow sensors therein.

BACKGROUND

Many commercial products are produced using chemical as well as biological processes. Pharmaceuticals, for example, are produced in commercial quantities using scaled-up reactors and other equipment. So-called biologics are drugs or other compounds that are produced or isolated from living entities such as cells or tissue. Biologics can be composed of proteins, nucleic acids, or complex combinations of these substances. They may even include living entities such as cells. In order to produce biologics on a commercial scale, sophisticated and expensive equipment is needed. In both pharmaceutical and biologics, for example, various processes need to occur before the final product is obtained. For example, in the case of biologics, cells may be grown in a growth chamber or the like and nutrients may need to be carefully modulated into the growth chamber. Waste products generated by cells may also have to be removed on a controlled basis from the fermentation chamber. As another example, biologic products produced by living cells or other organisms may need to be extracted and concentrated. This process may involve a variety of filtration and separation techniques.

Because there are a number of individual processes required to be produce the final product, various reactants, solutions, and washes are often pumped or otherwise transported to various subsystems using conduits and associated valves. These systems may be quite cumbersome and organizationally complex due to the large numbers of conduits, valves, sensors, and the like that may be needed in such systems. Not only are these systems visually complex (e.g., resembling spaghetti) they also include many components that are required to be sterilized between uses to avoid cross-contamination issues. Indeed, the case of drug and biologic preparation, the Federal Food and Drug Administration (FDA) is becoming increasingly strict on cleaning, sterilization or bio-burden reduction procedures that are required for drug and pharmaceutical preparations. This is particularly of a concern because many of these products are produced in batches which would require repeated cleaning, sterilization or bio-burden reduction activities on a variety of components.

During the manufacturing process of pharmaceuticals and biologics there often is a need to incorporate sensors into the manufacturing process so that process variables are monitored. For example, the process variables that need to be monitored may include temperature, pressure, pH, conductivity, flow rate, and the like. In conventional setups, sensors are placed directly along one or more points of the production process whereby the sensors themselves are inserted into the production stream where the sensor makes direct contact with the reactant or product stream. Still other sensors may be positioned on the exterior of the conduit or tubing and used to monitor conditions in a non-invasive manner. For example, ultrasonic flow measurement devices are known that can be affixed to the outside of tubing used in low-pressure applications such as heart-lung machines. For example, em-tec GmbH (Germany) sells a line of flowmeters that can be used to measure the flow rate in such extracorpeal systems. While such flow sensors may be used for low-pressure environments, these sensors are not suitable for high-pressure applications. For example, the conduit and/or sensor unit may burst or otherwise fail when exposed to expansion forces created during high-pressure applications. In addition, such flow sensors cannot be used with reinforced conduit as the braiding or reinforcement interferes with the flow measurement signals. Unfortunately, high-pressures (e.g., those above about 30 psi) are increasingly being used in manufacturing processes for pharmaceuticals and biologics.

While reinforced conduit or tubing may be used for high pressure applications, these solutions suffer from the limitation that the tubing or conduit cannot be configured with sharp bends or curves to the reinforced nature of the tubing. The use of reinforced conduit or tubing thus requires long sections of conduit so that bends can be accommodated. This makes the layout and designs large and unwieldy. Moreover, such designs leave large hold-up volumes in the tubing and conduit which can mean the loss of significant dollars in product or reagents. While unreinforced tubing and conduit may be used in some applications, when higher pressures are used, unreinforced tubing or conduit may fail or burst. Moreover, in many applications, the system needs to undergo a pressure or integrity test to ensure that the components will operate properly. During such testing procedures, which can be conducted at elevated pressures, unreinforced tubing may tend to torque, move, or balloon which disrupts operational parameters and results in inaccurate results. There thus is a need for flow sensing devices that can be incorporated into high fluid pressure process streams.

SUMMARY

According to one embodiment of the invention, a fluid monitoring assembly for measuring the flow rate of a fluid includes a flexible conduit having a wall that defines a lumen or passageway through which fluid passes. The fluid monitoring assembly includes a flow sensor configured to be removably secured around the exterior of the flexible conduit, the flow sensor having one or more transducer/receiver pairs. The fluid monitoring assembly further includes a housing having first and second portions connected to one another at a hinge (or multiple hinges), the first and second housing portions each defining respective recessed interior portions configured to encapsulate or pot at least the flow sensor. The recessed interior portions collectively together define a cavity that is shaped to encapsulate the flow sensor. Preferably, the cavity is sized and shaped so as to snuggly accommodate the flow sensor when the first and second housing portions are closed together.

According to another embodiment, a fluid monitoring assembly for measuring the flow rate of a fluid includes a flexible conduit having a wall that defines a lumen or passageway through which fluid passes, the flexible conduit having one or more branches connected to a main flow path. A flow sensor is removably secured around the flexible conduit in the main flow path or one of the one or more branches, the flow sensor having one or more transducer/receiver pairs arranged about the exterior of the flexible conduit. The fluid monitoring assembly has a housing having first and second portions connected to one another at a hinge (or multiple hinges), the first and second housing portions each defining respective recessed interior portions configured to encapsulate or pot the flow sensor. The recessed interior portions collectively together define a cavity that is shaped to encapsulate the flow sensor. Preferably, the cavity is sized and shaped so as to snuggly accommodate the flow sensor when the first and second housing portions are closed together. Optionally, one or more pinch valves are disposed on the housing and configured to pinch the flexible conduit in the main flow path or within one or more of the branches.

According to another embodiment, the fluid monitoring assembly for measuring the flow rate of a fluid includes a flexible conduit having a wall that defines a lumen or passageway through which fluid passes. The fluid monitoring assembly includes a housing having first and second portions connected to one another at a hinge (or multiple hinges), the first and second housing portions each defining respective inner surfaces that encapsulate and hold the flexible conduit. In this embodiment, the flow sensor is integrated directly into the housing. For example, the transducer/receiver pairs are integrated directly into the first and second portions of the housing (e.g., embedded therein). In this manner, there is no need for a recessed interior portion that defines a cavity for holding a separate flow sensor.

BRIEF DESCRIPTION OF THE DRAWINGS

FIG. 6 illustrates yet another embodiment of a fluid monitoring assembly. In this embodiment, the flow sensor is contained in the two-part jacket; either potted or encapsulated or directly incorporated in to the body of the two-part jacket.

DETAILED DESCRIPTION OF THE ILLUSTRATED EMBODIMENTS

Figure 1A:
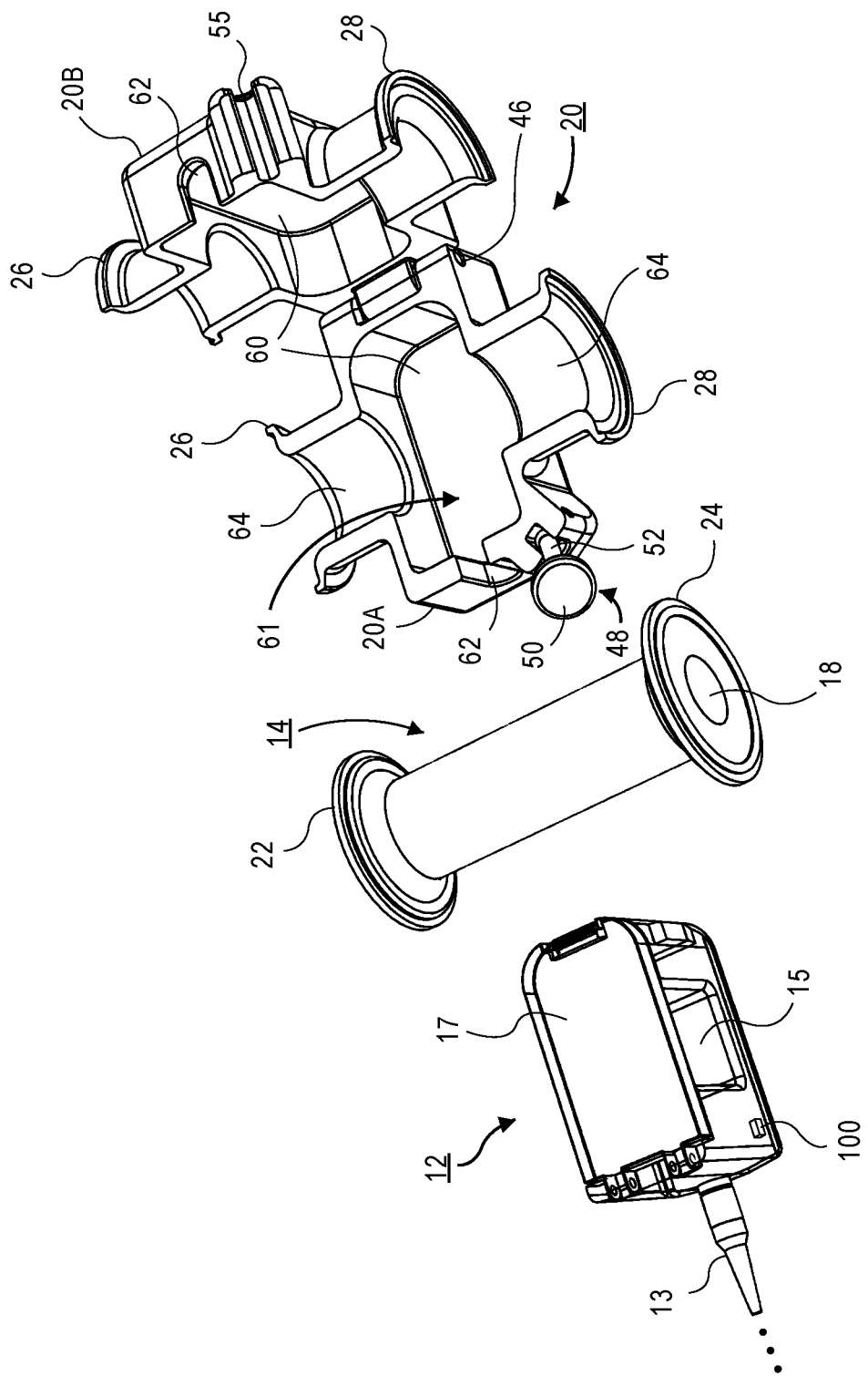
FIG. 1A illustrates an exploded perspective view of a fluid monitoring assembly according to one embodiment. The fluid monitoring assembly in this embodiment includes a flexible conduit, a housing having first and second portions connected via a hinge, and a separate flow sensor that surrounds the flexible conduit and also fits within an internal cavity that is formed in the housing.

FIGS. 1A-1D illustrate an embodiment of a fluid monitoring assembly 10 according to one illustrative embodiment. The fluid monitoring assembly 10 includes a flow sensor 12 that is mounted about the exterior of a portion or segment of flexible conduit 14. The flow sensor 12 is able to detect the flow rate of fluid passing through the flexible conduit 14 in a non-invasive manner. The flow sensor 12, in one embodiment, uses one or more transducer/receiver pairs 16 (seen in FIG. 2) that are used to measure the flow rate of fluid passing through a lumen 18 or passageway of the flexible conduit 14. The transducer/receiver pairs 16 preferably employ ultrasonic converters (e.g., piezoceramics) that transmit high-frequency acoustic signals with and against the flow direction of fluid within the lumen 18. The flow sensor 12 operates on the transit-time (TT) ultrasonic method which measures the time differentials between acoustic signals that pass from a transducer of a transducer/receiver pair 16 on one side of the flexible conduit 14 to a receiver of the transducer/receiver pair 16 located on the opposing side of the flexible conduit 14.

Figure 2:
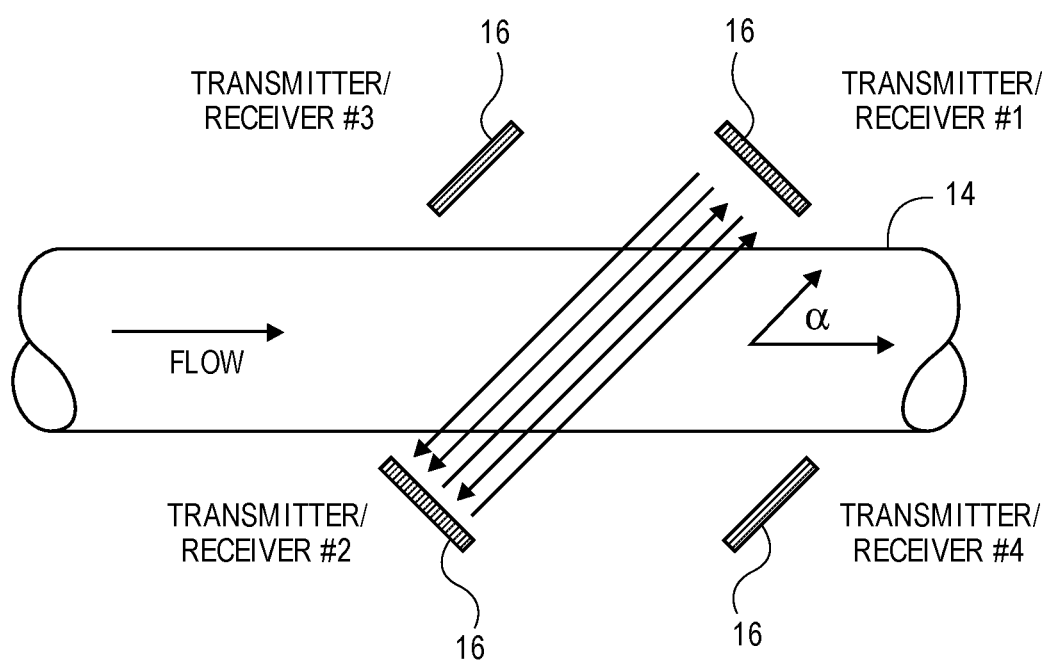
FIG. 2 illustrates the "X" configuration of the operation of a flow sensor according to one embodiment.

The piezoceramic element of the transducer/receiver pair 16 is excited by a set of high-frequency vibrations (driven by an applied voltage) and transmits ultrasonic waves to the opposing receiver. Each piezoceramic element of the transducer/receiver pair 16 acts, alternately, as transmitter and receiver. The piezoceramic elements are arranged at an angle α as seen in FIG. 2 relative to the flow direction of the fluid (or long axis of the lumen 18). The transit time of the ultrasonic waves are influenced by the flowing fluid. Waves that travel with the flow of fluid will have faster transmit times. Conversely, ultrasonic waves that travel against the flow of fluid will have longer transit times. The flow velocity of the fluid medium can then be calculated using the measured transit time differential. The difference in transit times in the upstream and downstream direction is proportional to the volumetric flow rate. The flow rate can then be calculated by using the known cross-sectional area of the lumen 18 of the flexible conduit 14 that is being scanned by the ultrasonic transmission.

One example of a commercially available flow sensor 12 that may be used in conjunction with the invention is the em-tec BioProTT™ flow sensor 12 (available from em-tec Flow Technology LP, Berkshire, N.Y.). These flow sensors 12 are commercially available clamp-on flow transducers that clamp around the flexible conduit 14. The em-tec BioProTT™ flow sensor 12 can be used on flexible conduit or tubing 14 with outer diameters ranging from ¼ inch to 1⅝ inches. Of course, other sizes of flexible conduit 14 beyond these ranges specific can also be used. These flow sensors 12 can be used with water, buffer solutions, cell culture media, fermentation media, and other biological fluids such as blood. In the illustrated embodiment of FIG. 2, the flow sensor 12 uses four ultrasound converters in a crosswise arrangement (e.g., "X" method) to transmit, alternatively, high frequency sound signals with and against the direction of flow. The orientation of the ultrasound converters in the crosswise arrangement is seen in FIG. 2. The X pattern arrangement of the transducers acoustically illuminates the entire cross-section of the lumen 18 with four sound paths. While the "X" configuration is illustrated in FIG. 2, in other embodiments, it may be possible to have a flow sensor 12 that only has two transducer/receiver pairs 16 (e.g., #1 and #2 or #3 and #4). Signals traveling with the fluid flow will have a faster transit time and those travelling against the flow will have slower transit times. The transit time is measured; the transit-time difference between the upstream and downstream movement of the impulses is proportional to the volumetric flow and can be expressed using the following equation:

$$V = K \cdot D / \sin 2\theta \cdot 1/(T_0-t)^2 \Delta T \qquad \text{(Eq. 1)}$$

where:
V=Mean velocity of flowing fluid
K=Constant
D=ID of pipe, tubing, or conduit
θ=Incident angle of ultrasonic burst waves
$T_0$=Zero flow transit time
$\Delta T = t_{AB} - t_{BA}$
$t_{AB} = L/c_0 + v \cdot \cos\alpha$
$t_{BA} = L/c_0 - v \cdot \cos\alpha$
and where:
L=Total distance from transducer to transducer
$c_0$=Speed of sound in liquid
v=Average liquid velocity
α=Angle of ultrasonic burst wave in liquid
t=Transit time of burst waves through tubing/conduit lining The flow sensor 12 includes a cable 13 or other wiring that is used to activate the transducers as well as output signals generated by the receiver. Alternatively, the flow sensor 12 could be powered by a battery or the like and data may be wirelessly transmitted to/from the flow sensor 12 via a remote interface device (not shown) using known wireless protocols. In the illustrated embodiment, the cable 13 will interface with a power supply that supplies the power to the piezoceramic elements. The flow sensor 12 may interface with electronics using an analog or digital signal (e.g., using a RS-232, 16 pin, or other serial cable). The flow sensors 12 may be configured with analog current output (e.g., 4-20 mA) for flow and received signal strength (RSS), and RS-232 digital output which can be used to integrate into existing bio/pharmaceutical process software and hardware. In other embodiments, TCP/IP communication protocol may be used. Of course, as noted above, instead of the cable 13, the data may be transmitted wirelessly to a flow meter, controller, or other interface using a commonly known wireless transmission protocol (e.g., WiFi or Bluetooth®). Any known data transmission protocol can be used to communicate with the flow sensor 12 (and other sensors described herein).

Still referring to FIGS. 1A-1D, the two-part housing 20 includes two recessed regions 60 located within respective halves 20A, 20B that together define a cavity 61 that is used to hold the flow sensor 12. The recessed regions 60 are dimensioned to snugly contain the flow sensor 12 and allow the two-part housing 20 to close and securely encapsulate the flow sensor 12. The recessed regions 60 are dimensioned to provide a tight fit between the flow sensor 12 and the two-part housing 20. For example, the lid or top 17 of the flow sensor 12 cannot open when the flow sensor 12 is potted within this cavity and the two-part housing 20 closed thereon. The housing 20 also includes two grooves 62 that mate together and provide a passageway for the cable 13.

Figure 1B:
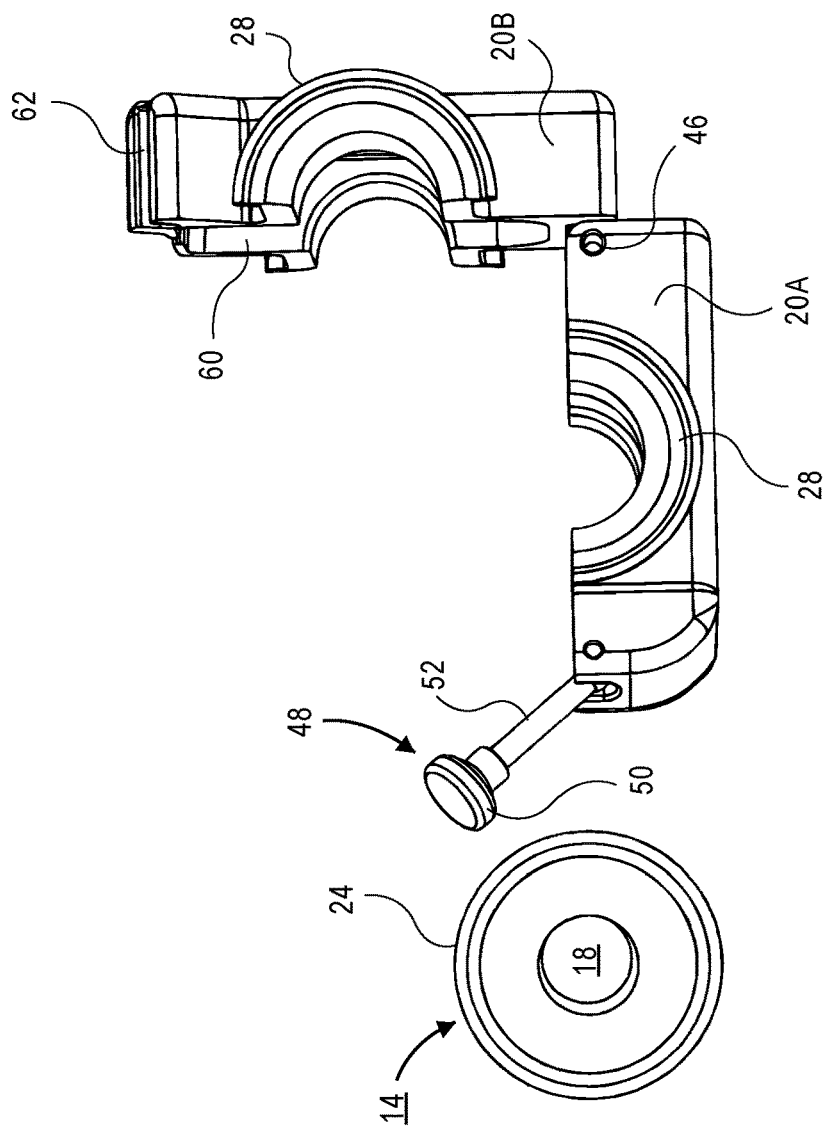
FIG. 1B illustrates a side view of the components of the fluid monitoring assembly of FIG. 1A. The two-part housing is illustrated along with the flexible conduit and the separate flow sensor.
Figure 1C:
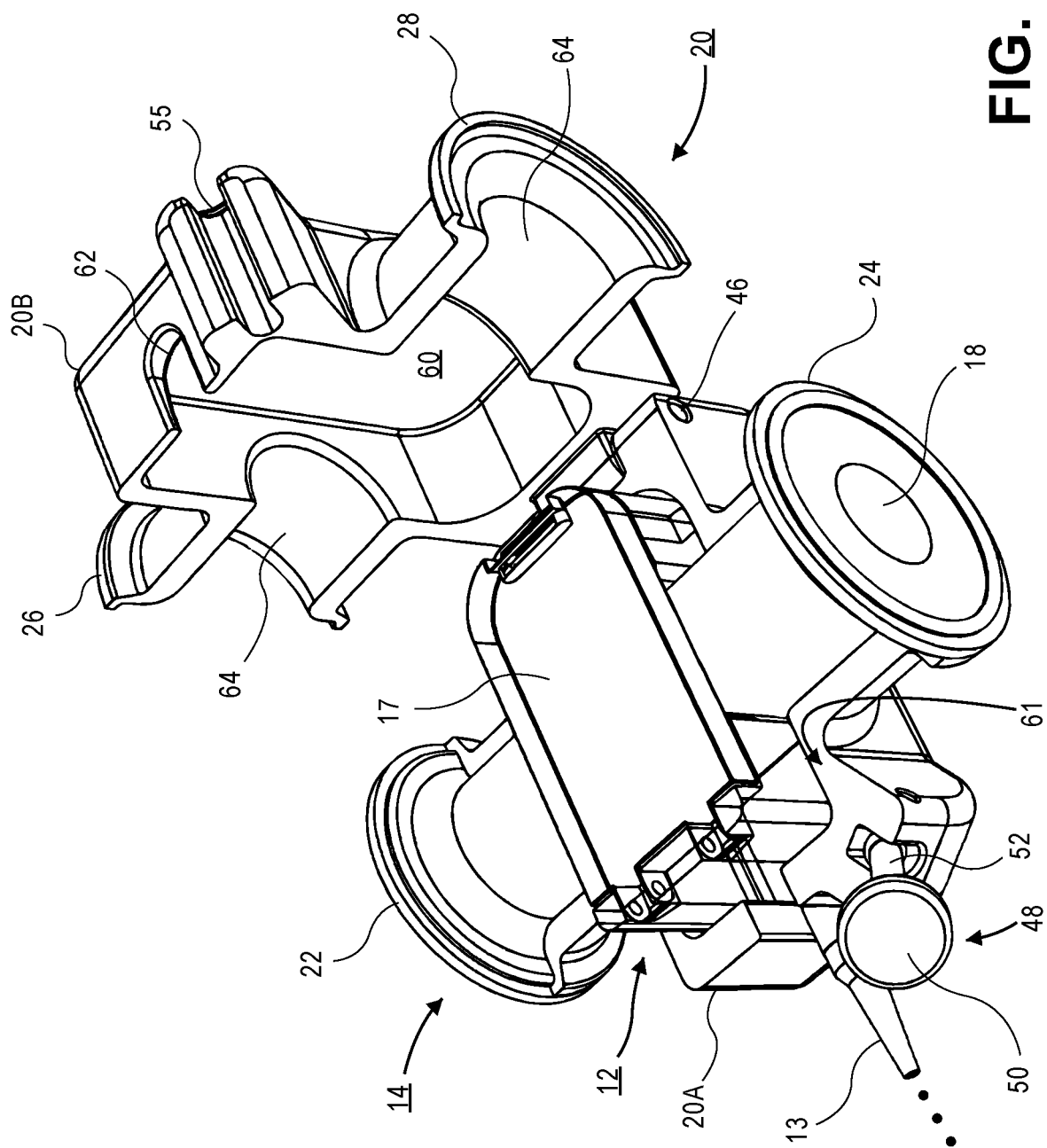
FIG. 1C illustrates a perspective view of the fluid monitoring assembly illustrated in FIGS. 1A and 1B with the flow sensor located within the internal cavity.

As seen in FIGS. 1A and 1C, the two-part housing 20 further includes semi-circular inner recesses 64 located in each half 20A, 20B that are used to hold the flexible conduit 14. When the respective halves 20A, 20B are brought together, a circular shaped passageway is formed that securely holds the flexible conduit 14. While the recesses 64 illustrated in the drawings are semi-circular shaped, these recesses may have different geometrical profiles depending on the shape of the flexible conduit 14.

The flow sensor 12 may optionally have contained therein or integrated therein a memory 100 (FIG. 1A). The memory 100 may include a volatile or non-volatile memory. One example of memory 100 that may be used in connection therewith includes EEPROM and flash memory. In one preferred aspect, the memory 100 stores information related to the individual flow sensor 12 and, as explained in more detail below, at least some calibration information relating to the flow sensor 12. The stored information may include a serial number for the sensor, a manufacturing date, lot ID, a calibration date, and a plurality of calibration points, calibration curve, or calibration function. The multiple calibration points are used to ensure that a particular parameter (e.g., flow rate) may be measured by the flow sensor 12. Information from the flow sensor 12 may be read out using interfacing electronics such as the power source that is connected to the flow sensor 12 or it may include other hardware that is used to integrate the fluid monitoring assembly 10 into the system. In one embodiment, calibration information may be written to the memory 100 to update the calibration settings based on actual in-line operation of the flow sensor 12.

FIG. 1B illustrates an end view of the flow sensor 12, flexible conduit 14, and two-part housing 20 according to one embodiment. The flow sensor 12 includes an aperture 15 that is dimensioned to hold the flexible conduit 14 therein. The aperture 15 is typically polygonal, e.g., square or rectangular in cross-section as seen in FIG. 1B. The flow sensor includes a top 17 that is hinged on the flow sensor 12 and opens/closes to allow the flow sensor 12 to be placed on the exterior of the flexible conduit 14. The em-tec Bio-ProTT™ flow sensor 12 includes a spring lock that is used to lock the top 17 over the flexible conduit 14 when closed. The flexible conduit 14 should fit snugly in the aperture 15 and should not be loose. To achieve good acoustic coupling, an optional acoustic couplant (e.g., water-based ultrasonic couplant) may be applied to the exterior of the flexible conduit 14 prior to use. The couplant also aids in inserting the flexible conduit 14 into the aperture 15.

Figure 1D:
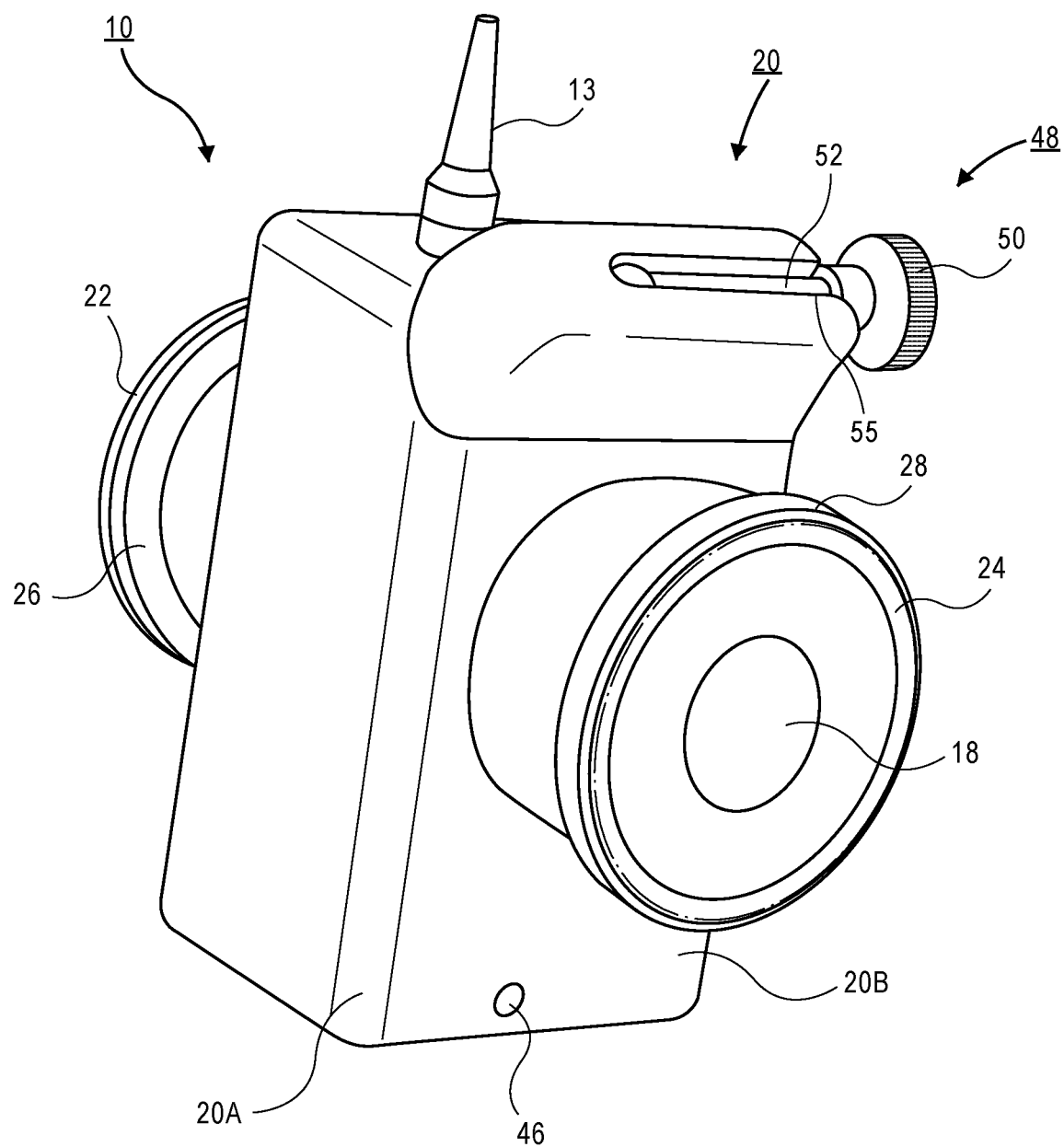
FIG. 1D illustrates a perspective view of the fully assembled fluid monitoring assembly illustrated in FIGS. 1A and 1B. The flow sensor is mounted in the two-part housing.

The transmitter/receiver pairs 16 are arranged inside the body of the flow sensor 12 to transmit high frequency acoustic waves across the aperture 15 (and the flexible conduit 14 that is contained in the aperture 15). FIG. 1D illustrates the assembled fluid monitoring device with the two-part housing 20 in the closed state. For example, the flow sensor 12 may be coupled via the cable 13 to the BioProTT™ flow meter (available from em-tec Flow Technology LP, Berkshire, N.Y.) which is used to read the flow readings obtained from the flow sensor 12. The BioProTT™ flow meter receives flow received signal strength (RSS) values which indicate the ultrasonic signal transmission quality through the liquid or fluid. The BioProTT™ flow meter also receives (in analog mode) a current output that is translated to a flow rate using, for example, a calibration curve or calibration function provided by the manufacturer. Alternatively, data may be communicated digitally to the flow meter from the flow sensor using a digital interface. In some alternative embodiments, the data may be further transmitted or communicated to another device such as a digital PLC which is integrated to control various aspects of the fluid-based process (e.g., valve operation, pump operation, and the like). In addition, the cable 13 may couple to a transmitter device that is able to receive signals from multiple sensors or devices (e.g., sensors 164 of FIG. 6).

Turning back to FIGS. 1A-1D, the flexible conduit 14 may be designed as a length of unreinforced tubing in which a lumen 18 is defined by a wall of the flexible conduit 14. The fluid monitoring assembly 10 further includes a two-part housing 20 that is used to encapsulate the flexible conduit 14 and the flow sensor 12 when the flow sensor 12 is mounted therein. The entirety of the flow sensor 12 is preferably encapsulated except for a portion of the cable 13 that extends out of the two-part housing 20. The two-part housing 20 acts as jacket or exoskeleton that surrounds the flexible conduit 14 and the flow sensor 12 contained therein. The two-part housing or jacket 20 defines an exoskeleton-type structure that surrounds the unreinforced polymer conduit 14 and prevents the unreinforced polymer conduit 14 from failing (e.g., bursting or forming an aneurysm type bulge in the conduit) under high fluid pressures. The housing or jacket 20 also prevents the flow sensor 12 from opening or otherwise breaking due to high pressures contained within the lumen 18 of the flexible conduit 14. The fluid monitoring assembly 10 can handle significant fluid pressures by using the encapsulated construction. For example, the fluid monitoring assembly 10 can withstand pressures exceeding 100 psi in some applications without damage or failure.

The flexible conduit 14 includes the lumen 18 extending between opposing ends through which fluid passes. The flexible conduit 14 may be made from a polymer material. Examples of materials usable for the flexible conduit 14 include, by way of example, thermoplastic elastomers (TPE), thermoplastic rubber (TPR), silicone (thermally or UV-cured), or other polymers. It should be understood that the list above is illustrative only and other polymer materials that form the flexible conduit 14 may be used. As one example of a flexible conduit 14, one end of the flexible conduit 14 may be an inlet to the fluid monitoring assembly 10 while the opposing end of the flexible conduit 14 may be an outlet to the fluid monitoring assembly 10. In one embodiment, the flexible conduit 14 terminates at opposing ends with flanges 22, 24 as seen in FIGS. 1A, 1B, 1C, 1D, 3, 4, 5, and 6. In some alternative embodiments, the flexible conduit 14 may not terminate in flanges as illustrated and may be omitted entirely. In the embodiment of FIGS. 1A-1D, the housing 20 includes respective receiving flange portions 26, 28 that are dimensioned to receive the corresponding flanges 22, 24 of the flexible conduit 14 when the housing 20 is closed about the flexible conduit 14.

The flexible conduit 14 is typically formed as a cylindrical segment of tubing although other geometries are contemplated. The receiving flanges 26, 28 are designed to mate with corresponding flanges (not shown) contained in another device or housing that is used in the manufacturing process. In this regard, the fluid monitoring assembly 10 may be inserted at desired locations so that the flow sensor 12 may be easily added or removed as necessary. Typically, the respective facing surfaces of the flanges 26, 28 (and opposing ends) are held together via a conventional clamp or the like such as the clamp or collar 76 of FIG. 3 or clamps 122 of FIG. 5.

The two-part housing 20 is made from a rigid material. In one preferred embodiment, the two-part housing 20 is typically made from a polymer material such as a plastic material. Materials include standard thermoplastics and polyolefins such as polyethylene (PE) and polypropylene (PP) or a hard plastic such as polyetherimide (PEI) such as ULTEM resins. The two-part housing 20 may also be formed from fluoropolymers such as polyvinylidene fluoride (PVDF) or perfluoroalkoxy (PFA), polytetrafluoroethylene (PTFE), polycarbonate (which may be more thermally resistant), polysulfone (PSU), and the like. The two-part housing 20 may also be made of metals. The two-part housing 20 includes a first half 20A and a second half 20B that are connected together via a hinge 46. The hinge 46 may be constructed, for example, as a rod, post, or pin that is contained within an aperture or bore within the two-part housing 20 that permits the first half 20A and second half 20B to pivot from a closed state to an open state so that the flexible conduit 14 and the flow sensor 12 can be easily removed and replaced.

A fastener 48 such as a locking knob 50 and associated hinged, locking arm 52 can be used to fixedly hold the two-part housing 20 in the closed state. The locking arm 52 may be threaded and the locking knob 50 contains corresponding threads and can be tightened or loosened by rotation of the knob 50. To close the housing 20, the locking arm 52 is rotated within a groove 55 contained on the second half 20B of the housing 20 and the knob 50 is tightened to secure the first half 20A securely to the second half 20B of the housing 20. In some embodiments, multiple fasteners 48 may be used. Of course, other types of fasteners 48 can be used in place of or in conjunction with the locking arm 52 and knob 50. These include screws, nuts, clamps, bands, ties, and the like.

Figure 3:
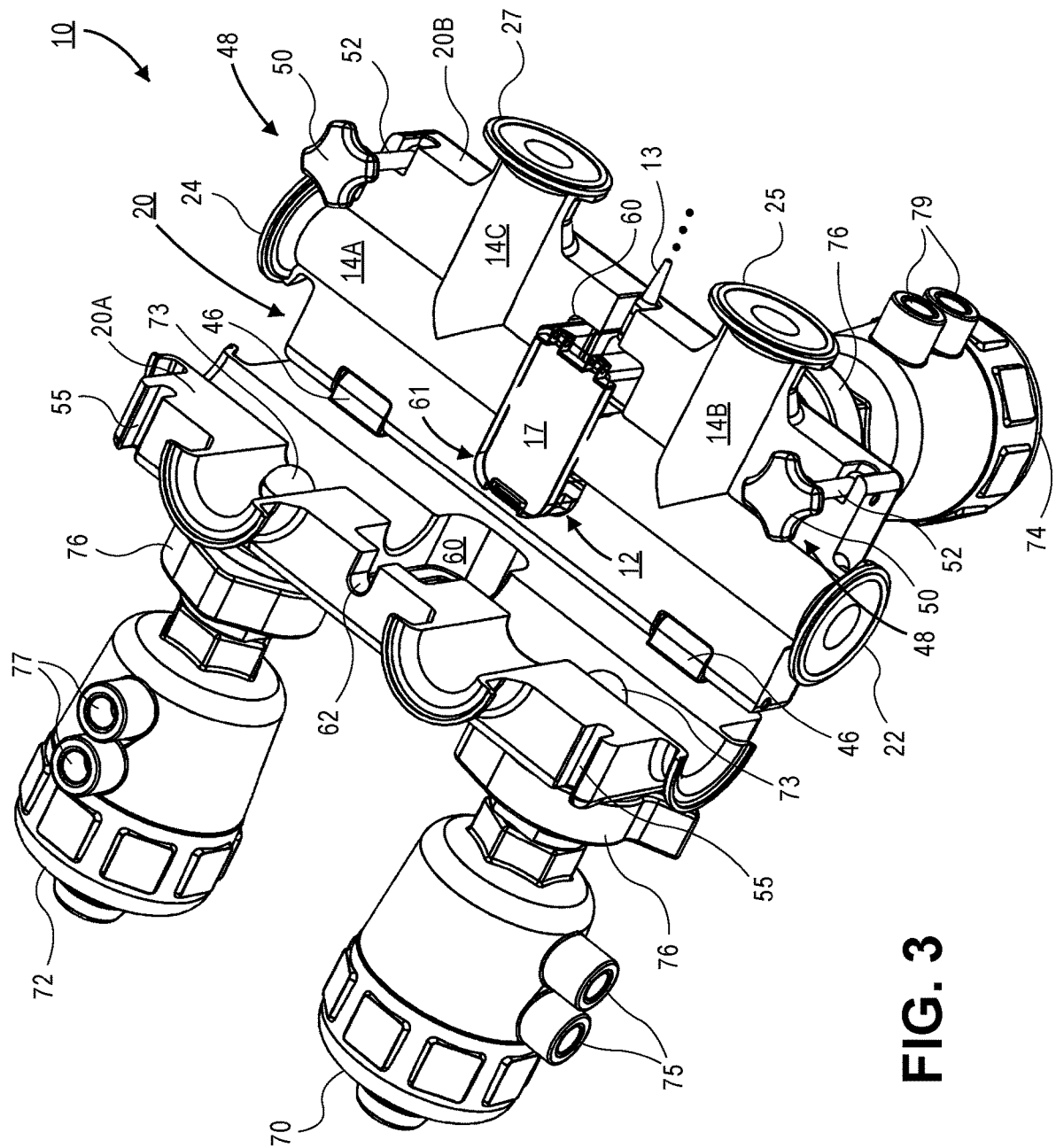
FIG. 3 illustrates another embodiment of a fluid monitoring assembly that incorporates one or more pinch valves.

FIG. 3 illustrates another embodiment of a fluid monitoring assembly 10. In this embodiment, similar elements to those described above are given similar reference numbers for sake of clarity. In this embodiment, unlike the prior embodiments, one or more valves 70, 72, 74 are provided as part of the fluid monitoring assembly 10. The one or more valves 70, 72, 74 are used to selectively close or open portions of the flexible conduit 14. The one or more valves 70, 72, 74 are pinch valves that close the flexible conduit 14 when actuated. Actuation of a particular valve 70, 72, 74 causes extension of an actuating element 73 which pinches the underlying flexible conduit 14. As illustrated in FIG. 3, the flexible conduit 14 includes a main conduit line 14A and two branch conduit lines 14B, 14C. The ends of the main conduit line 14A terminate in flanges 22, 24 as in the prior embodiment although these are not mandatory and may be omitted. The branch conduit lines 14B, 14C also terminate in respective flanges 25, 27 which, again, are not mandatory depending on the fluid configuration. The flanges 22, 24, 25, 27 of the main conduit line 14A and branch conduit lines 14B, 14C are encapsulated when the two-part housing 20 is closed via respective housing flanges as seen in FIG. 3.

In the embodiment of FIG. 3, each of the valves 70, 72, 74 is mounted on one of the halves 20A, 20B of the two-part housing 20 at a location such that actuation of the valve 70, 72, 74 moves an actuating element 73 to extend axially to pinch the underlying main conduit line 14A or the branch conduit line 14B. The particular valve 70, 72, 742 may be positioned on the fluid monitoring assembly 10 so as to pinch (or release) either the main conduit line 14A or the branch conduit line 14B. By pinching the main conduit line 14A, fluid does not flow past this pinch point. Of course, the valve 70 may also be actuated to open fluid flow within the main conduit line 14A in which chase the actuating element 73 retracts in the opposite direction. In this regard, flow can be selectively modulated by actuation of the valve 70. The second valve 72 is mounted on the same housing half 20A at a location such that that its actuating element 73 extends axially to pinch the branch conduit line 14C. The third valve 74 is mounted on the other housing half 20B at a location such that the actuating element 73 extends axially to pinch the branch conduit line 14B. The three valves 70, 72, 74 permit fluid to be selectively flowed through the main line 14A or the branch lines 14B, 14C.

The valves 70, 72, 74 may be any number of types of valves commonly known to those skilled in the art. For example, the valves may be manual valves whereby a bonnet or the like is rotated manually to advance/retract the actuating element 73. Alternatively, the valves 70, 72, 74 may be automatically actuated valves such as pneumatically-actuated valves using air ports 75, 77, 79 such as those illustrated in FIG. 3. These valves 70, 72, 74 are actuated with the aid of gas lines connected thereto (not shown) that computer-controlled using an electro-pneumatic system incorporated into the valve design. The valves 70, 72, 74 may also include an optional position feedback indicator (not shown) that indicates the position or state of the valve 70, 72, 74 (e.g., open or closed). The valves 70, 72, 74 may also be electrically-actuated pinch valves. Such valves may be toggled between on/off states or in other instances may be partially opened or partially closed for fine modulating control. Other types of valves 70, 72, 74 that may be used in connection with the fluid monitoring assembly 10 include diaphragm, solenoid, plug, globe, butterfly, gate valves and the like.

As seen in FIG. 3, the flow sensor 12 is located within respective recesses 60 formed within the two-part housing 20 to form the cavity 61. The cable 13 is able to exit the housing 20 via opposing grooves 62 that combine to form an aperture through which the cable 13 passes. The flow sensor 12 is illustrated as being secured to the main line 14A but the flow sensor 12 can be located anywhere on the flexible conduit 14 including branch conduit lines 14B and 14C. Note that in this embodiment, a pair of fasteners 48 with respective locking knobs 50 and associated hinged, locking arms 52 as explained herein are used to fixedly hold the two-part housing 20 in the closed state. As seen in FIG. 3, the housing halves 20A, 20B are connected via a pair of hinges 46. The respective valves 70, 72, 74 may be mounted to the housing halves 20A, 20B using a conventional clamp or collar 76. The clamp or collar 76 may surround matting flanges from adjacent components.

To use the fluid monitoring assembly 10 (in any potted embodiment disclosed herein), the flow sensor 12 is first positioned about the flexible conduit 40. In the case of the em-tec BioProTT™ flow sensor 12 the lid 17 of the flow sensor 12 is opened and the flexible conduit 40 is placed inside the aperture 15 (see FIG. 1C and FIG. 3). Another commercially available flow sensor that may be used in accordance with the fluid monitoring assemblies disclosed herein include the SONOFLOW series of clamp-on sensors for the non-invasive flow rate measurement. The SONO-FLOW clamp-on sensors are available from SONOTEC Ultrasonic Solutions (SONOTEC US, Inc. of Central Islip, N.Y.). The lid 17 is then closed over the flexible conduit 40 using the spring locking feature of the flow sensor 17. The flexible conduit 40 with the flow sensor 12 attached is then placed into one of the recesses 60 of the two-part housing 20.

The flow sensor 12 is positioned in the recess 60 and the flexible conduit 40 is also placed in the corresponding semi-annular receiving passageways formed in the respective housing halves 20A, 20B. The flow sensor 12 may be positioned in either direction so that it can properly measure the flow rate (e.g., flow sensor 12 may be flipped over to measure flow moving in the opposite direction). With the flow sensor 12 positioned within the two-part housing 20, the housing 20 can then be closed by pivoting the housing halves 20A, 20B about the hinge(s) 46. The housing 20 can then be locked in place using the fastener(s) 48. In one aspect, the flow sensor 12 may be factory calibrated and used immediately after closing the housing 20. Alternatively, the flow sensor 12 may be re-calibrated after placement inside the housing 20.

Figure 4:
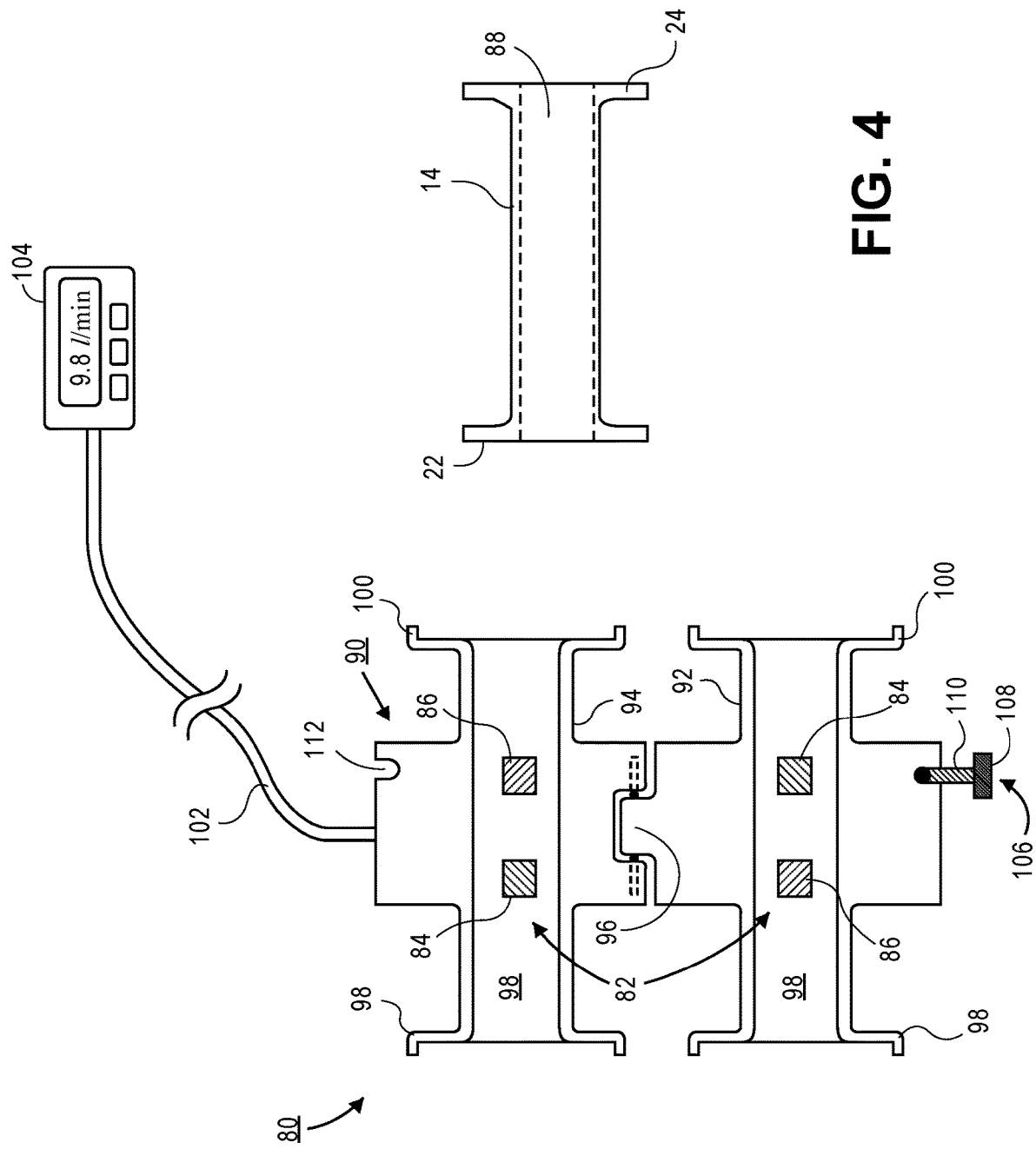
FIG. 4 illustrates another embodiment of a fluid monitoring assembly that incorporates the flow sensor or elements of the flow sensor directly into the housing. There is no separate flow sensor that is potted or loaded into the device as the sensor or sensing elements are integrated directly into the housing.

FIG. 4 illustrates an alternative embodiment of the fluid monitoring assembly 80. In this embodiment of the fluid monitoring assembly 80, the flow sensor 82 is directly integrated into the body or two-part housing 84 of the fluid monitoring assembly 80. The flow sensor 82 includes one or more transducer/receiver pairs 84, 86 that are used to measure the flow rate of fluid passing through a lumen 88 or passageway of the flexible conduit 14 when placed inside the fluid monitoring assembly 80. As seen in this embodiment, the flexible conduit 14 includes flanges 22, 24 although in other embodiments these flanges 22, 24 may be omitted entirely. The one or more transducer/receiver pairs 84, 86 as seen in FIG. 4 are embedded directly within a two-part housing 90. When the two-part housing 90 is closed the one or more transducer/receiver pairs 84, 86 are located on opposing sides of the flexible conduit 14. The two-part housing 90 includes a first half 92 and a mating second half 94 that are connected to one another via a hinge 96. Each of the first half 92 and the second half 94 include a semi-annular passageway 98 formed therein that define an interior passageway that holds the flexible conduit 14 when placed therein. In this embodiment, each half 92, 94 of the two-part housing 90 includes respective flanged ends 98, 100 that encapsulate the flanged ends 22, 24 of the flexible conduit 14. Again, the use of the flanged ends 98, 100 is optional and these may be omitted in other embodiments of the invention.

In the embodiment of FIG. 4, the one or more transducer/receiver pairs 84, 86 are used by the flow sensor 82 in the transit-time (TT) ultrasonic method which, as explained above, measures the time differentials between acoustic signals that pass from a transducer of a transducer/receiver pairs 84, 86 on one side of the flexible conduit 14 to a receiver of the transducer/receiver pair 84, 86 located on the opposing side of the flexible conduit 14. The configuration of the transducer/receiver pairs 84, 86 may be in the "X" configuration such as that illustrated in FIG. 2. In the embodiment of FIG. 4, the transducer/receiver pairs 84, 86 of the flow sensor 82 are connected via a cable 102 to a flow meter 104 (like that described herein above) where flow measurements are displayed or otherwise calculated and reported.

As seen in FIG. 4, the two-part housing 90 includes a fastener 106 that is used to secure the two-part housing 90 in a closed configuration over the flexible conduit 14. For example, a fastener 106 such as a locking knob 108 and associated hinged, locking arm 110 can be used to fixedly hold the two-part housing 90 in the closed state. The locking arm 110 may be threaded and the locking knob 108 contains corresponding threads and can be tightened or loosened by rotation of the knob 108 about the shaft of the locking arm 110. To close the housing 90, the locking arm 110 is rotated within a groove 112 contained on the second half 94 of the housing 90 and the knob 108 is tightened to secure the first half 92 securely to the second half 94 of the housing 90.

In the embodiment of FIG. 4, the transducer/receiver pairs 84, 86 are illustrated as being located in separate halves 92, 94. It should be understood, however, that depending on the division of the housing 90, it may be possible to secure the necessary transducer/receiver pairs 84, 86 in only one side or half 92, 94 of the housing 90. For example, one part of the housing may be large enough to accommodate the transducer/receiver pairs 84, 86 while the other part acts as a cover to complete the entire housing 90. This likewise applies to other embodiments described herein as the multi-part housing or multi-part jacket may be divided into "unequal" sizes or shapes (e.g., one part covers about 270° while the other part covers) 90°.

Figure 5:
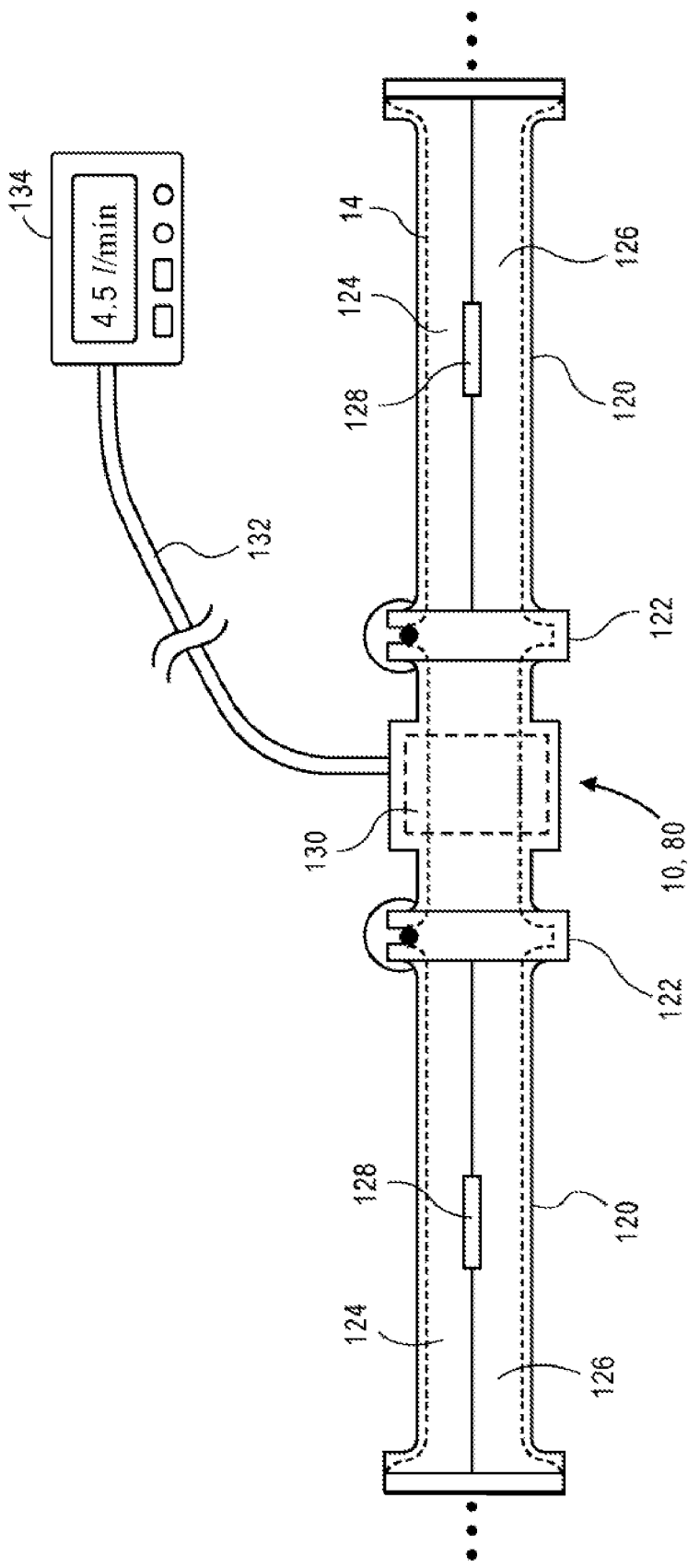
FIG. 5 illustrates another embodiment of a fluid monitoring assembly. The fluid monitoring assembly is illustrated interfacing with two-part jackets at either end.

FIG. 5 illustrates how the fluid monitoring assembly 10, 80 may be integrated into a pressurized fluid process. Specifically, FIG. 5 illustrates a fluid monitoring assembly 10, 80 that is secured at each end to a two-part jacket 120 that holds a flexible conduit 14 therein. In this embodiment, two clamps 122 are used to secure the two-part jacket 120 to respective flanged ends (as described herein) of the fluid monitoring assembly 10, 80. Each two-part jacket 120 includes two-part housing 124, 126 that is made from a rigid material (e.g., same materials for housing 20, 90). The two-part jacket 120 includes two portions that are connected to one another via a hinge 128 that allow the two-part jacket 120 to open/close as needed. The interior surface of the two-part jacket 120 is shaped in a semi-annular shape so that, when closed about the exterior of the flexible conduit 14, a circular-shaped passageway is formed that snuggly and securely holds the flexible conduit 14.

In this embodiment, there are three segments of flexible conduit 14. A first segment is located in the fluid monitoring assembly 10, 80. The second and third segments of flexible conduit 14 are located in the two-part jackets 120 that are secured to either side of the fluid monitoring assembly 10, 80. In this embodiment, the clamps 122 are used to secure the respective two-part jackets 120 to the fluid monitoring assembly 10, 80 as well as secure the flexible conduits 14 contained in the connected arrangement. As an alternative, a single flexible conduit 14 could extend through the full assembly illustrated in FIG. 5. Still referring to FIG. 5, the fluid monitoring assembly 10, 80 includes a flow sensor 130 that is either mounted on the exterior of the flexible conduit 14 and potted or encapsulated in the fluid monitoring assembly 10, 80 (like that in FIGS. 1A-D or FIG. 3) or is directly integrated into the fluid monitoring assembly (like that in FIG. 4). The flow sensor 130 includes a cable 132 that connects to a flow meter 134 that generates and displays and/or calculates the flow rate based on signals obtained from the flow sensor 130. Of course, instead of the cable 132, the data may be transmitted wirelessly to a flow meter 134 or other interface using a commonly known wireless transmission protocol (e.g., WiFi or Bluetooth®).

FIG. 6 illustrates another embodiment of a fluid monitoring assembly 150. The fluid monitoring assembly 150 in this embodiment has a flow sensor 152 that is integrated into the two-part jacket 154. The two-part jacket 154 is made of rigid material similar to that of two-part housing 20 described herein. The two-part jacket 154 includes a first half 156 and a second half 158 that are connected to one another via a hinge 160. A flexible conduit 14 fits within an interior passageway (e.g., circular-shaped passageway) that extends through the two-part jacket 154 when it is in the closed state as illustrated in FIG. 6. The fluid monitoring assembly 150 includes a flow sensor 162 that is either mounted on the exterior of the flexible conduit 14 and potted or encapsulated in the two-part jacket 154 (like that in FIGS. 1A-D or FIG. 3) or is directly integrated into the two-part jacket 154 (like that in FIG. 4). In this embodiment, the two-part jacket 154 includes one or more additional sensors 164 that are directly integrated into the two-part jacket 154. This could include, for example, a pressure sensor, turbidity sensor, conductivity sensor, and the like. The two-part jacket 154 may be secured together using one or more fasteners (not illustrated) like those illustrated in the other embodiments. In the illustrated embodiment, the flow sensor 162 includes a cable 166 that is used to provide power and/or provide for data transmission. FIG. 6 also illustrates additional cables 168, 170 for the one or more additional sensors 164. Of course, instead of the cables 166, 168, 170 the data may be transmitted wirelessly to a flow meter (e.g., flow meters 104, 134) or other interface using a commonly known wireless transmission protocol (e.g., WiFi or Bluetooth®). It should be understood that the embodiment of FIG. 6 is merely illustrative and any number and types of sensors 164 (or valves, or the like) may be included and the two-part jacket 154 may have any number of shapes and configurations. The same applies to all embodiments disclosed and described herein.

It should be understood that while many different embodiments are discussed herein, different embodiments may incorporate features or elements of other embodiments even though there are not specifically mentioned herein. For example, the features and constructions of the flow sensor 12, 82, flexible conduit 14, and two-part housing 20, 90 may have features that are interchangeable and usable with other embodiments. In addition, in some additional embodiments, other sensors beyond a flow sensor 12, 82 may be incorporated into the fluid monitoring assembly. Likewise, instead of a cable 13 or wired based communication and power system, communication may take place wirelessly and sensor operation may be battery powered. In yet another alternative, while the housings or jackets have been largely described as being two-part jackets or housings, other embodiments may have three or more part jackets or housings (e.g., multi-part jacket or multi-part housing). Of course, this will add some complexity with additional hinges needed between the additional parts. While embodiments of the present invention have been shown and described, various modifications may be made without departing from the scope of the present invention. The invention, therefore, should not be limited, except to the following claims, and their equivalents.

What is claimed is:

1. A method of using a fluid monitoring assembly for measuring the flow rate of a fluid comprising:
   providing a flow monitoring assembly comprising:
      a flexible conduit comprising one of silicone, thermoplastic elastomer, or thermoplastic rubber and having a wall that defines a lumen through which the fluid passes;
      a removable flow sensor configured to be removably secured around the flexible conduit with the flexible conduit disposed inside, the removable flow sensor having one or more transducer/receiver pairs; and
      a housing having first and second portions connected to one another at a hinge, the first housing portion having formed therein a first recessed portion, the second housing portion having formed therein a second recessed portion, wherein the first recessed portion and the second recessed portion collectively define a cavity that holds the removable flow sensor, and wherein the first and second portions of the housing are configured to snuggly encapsulate the removable flow sensor and the flexible conduit contained therein when in a closed state;

flowing a pressurized fluid through the flexible conduit; and measuring the flow rate of fluid through the flexible conduct with the removable flow sensor.

2. The method of claim 1, further comprising removing the flexible conduit from the housing and inserting a second flexible conduit comprising one of silicone, thermoplastic elastomer, or thermoplastic rubber into the housing and the removable flow sensor.

3. The method of claim 1, further comprising removing the flexible conduit and the removable flow sensor from the housing and inserting a second flexible conduit comprising one of silicone, thermoplastic elastomer, or thermoplastic rubber into the housing along with a second removable flow sensor.

4. The method of claim 1, wherein the flow monitoring assembly further comprises at least one valve mounted on the housing and configured to selectively pinch the flexible conduit and wherein the method further comprises actuating the at least one valve.

5. The method of claim 1, wherein the flow monitoring assembly further comprises one or more additional sensors located therein, wherein the one or more additional sensors measure one or more parameters of the pressurized fluid in the flexible conduit.

6. The method of claim 1, wherein the one or more transducer/receiver pairs of the removable flow sensor are configured to generate an acoustic wave across the flexible conduit, the method further comprising measuring a transit time of the acoustic wave with the one or more transducer/receiver pairs and converting the transit time to a measured flow rate of the pressurized fluid.

7. The method of claim 1, wherein the removable flow sensor further comprises a memory configured to store a plurality of calibration points.

8. The method of claim 1, wherein the removable flow sensor comprises a memory configured to store a calibration curve or function.

* * * * *